US006828502B2

(12) United States Patent
Green

(10) Patent No.: US 6,828,502 B2
(45) Date of Patent: Dec. 7, 2004

(54) FLUID RELEASE SYSTEM FOR SECONDARY CONDUITS EXTENDING BETWEEN A TRANSFORMER HOUSING AND A METER BOX AND METHOD OF USE

(76) Inventor: Gregory L. Green, 853 Friendship Rd., Lenoir City, TN (US) 37772

( * ) Notice: Subject to any disclaimer, the term of this patent is extended or adjusted under 35 U.S.C. 154(b) by 126 days.

(21) Appl. No.: 10/317,469

(22) Filed: Dec. 12, 2002

(65) Prior Publication Data

US 2004/0112620 A1 Jun. 17, 2004

(51) Int. Cl.[7] .................................................. H02G 3/10
(52) U.S. Cl. ...................... 174/48; 174/15.1; 174/14 R; 174/11 R; 174/73; 174/50; 174/53; 174/49; 174/50.51; 174/50.52; 174/54; 174/58; 174/59; 174/61; 174/65 R
(58) Field of Search ....................... 174/48, 15.1, 14 R, 174/11 R, 73, 50, 53, 49, 50.51, 50.52, 54, 58, 59, 61, 65 R

(56) References Cited

U.S. PATENT DOCUMENTS

| | | | |
|---|---|---|---|
| 2,351,520 A | | 6/1944 | Katzin et al. |
| 2,795,397 A | | 6/1957 | Hull et al. |
| 2,822,481 A | | 2/1958 | Schiller |
| 2,903,654 A | | 9/1959 | Bartenstein |
| 3,391,243 A | | 7/1968 | Whitehead |
| 3,621,911 A | * | 11/1971 | Baker et al. ............... 166/336 |
| 3,930,709 A | * | 1/1976 | Stanger et al. ............. 439/185 |
| 3,958,633 A | | 5/1976 | Britch et al. |
| 4,071,040 A | | 1/1978 | Moriarty |
| 4,078,184 A | | 3/1978 | Phelps et al. |
| 4,165,951 A | | 8/1979 | Friedman et al. |
| 4,219,045 A | | 8/1980 | Martini |
| 4,371,383 A | | 2/1983 | Rost |
| 4,415,036 A | | 11/1983 | Carmody et al. |
| 4,427,071 A | | 1/1984 | Carmody |
| 4,457,376 A | | 7/1984 | Carmody et al. |
| 4,598,731 A | | 7/1986 | Colson |
| 4,610,268 A | | 9/1986 | Knapp |
| 4,655,239 A | | 4/1987 | Kato |
| 4,660,891 A | | 4/1987 | Kramer-Wasserka |
| 4,694,903 A | | 9/1987 | Ringgenberg |
| 4,750,519 A | | 6/1988 | Chao-Chun |
| 4,880,534 A | | 11/1989 | Burrows |
| 4,926,945 A | | 5/1990 | Pringle et al. |
| 4,973,026 A | | 11/1990 | Swaurwein |
| 4,977,923 A | | 12/1990 | Cho |
| 5,224,686 A | | 7/1993 | Pacht |
| 5,253,679 A | | 10/1993 | Pacht |
| 5,263,508 A | | 11/1993 | Perrott |
| 5,299,593 A | | 4/1994 | Ottelli |
| 5,351,714 A | | 10/1994 | Barnowski |
| 5,396,918 A | | 3/1995 | Parker |
| 5,425,396 A | | 6/1995 | Wodeslavsky |
| 5,485,865 A | | 1/1996 | Shirk |
| 5,492,149 A | | 2/1996 | Loschelder et al. |

(List continued on next page.)

Primary Examiner—Dean A. Reichard
Assistant Examiner—Anton Harris
(74) Attorney, Agent, or Firm—Pitts & Brittian, PC

(57) ABSTRACT

A fluid release system for removing water within secondary conduits which contain electrical cables extending between a transformer and an electrical meter. The system includes a release valve having a side opening for release of water collected therein. The system further includes a flap connected to pivot between a closed position covering the side opening, and an open position for removal of water collected from secondary conduits connected to the release valve. The release valve is connected to secondary conduits extending between the transformer and the electrical meter installed on an exterior wall of a residential or commercial building. The fluid release system removes water from the secondary conduits before water is transferred to the electrical meter therefore minimizing water damage to the electrical meter and associated circuit breakers. A method of releasing water from within secondary conduits by operation of the release valve is also disclosed.

25 Claims, 4 Drawing Sheets

U.S. PATENT DOCUMENTS

| | | |
|---|---|---|
| 5,614,086 A | 3/1997 | Hill et al. |
| 5,652,970 A | 8/1997 | Wodeslavsky |
| 5,662,140 A | 9/1997 | Rucker |
| 5,671,770 A | 9/1997 | Rusche et al. |
| 5,676,343 A | 10/1997 | Beeson |
| 5,691,706 A * | 11/1997 | Butler et al. ............... 340/646 |
| 5,739,420 A | 4/1998 | Peterson |
| 5,762,092 A | 6/1998 | Yang |
| 5,873,518 A | 2/1999 | Richmond et al. |
| 6,105,595 A | 8/2000 | Jensen |
| 6,176,250 B1 | 1/2001 | Lin et al. |
| 6,341,622 B1 | 1/2002 | McHugh |
| 6,401,525 B1 | 6/2002 | Jamieson |

* cited by examiner

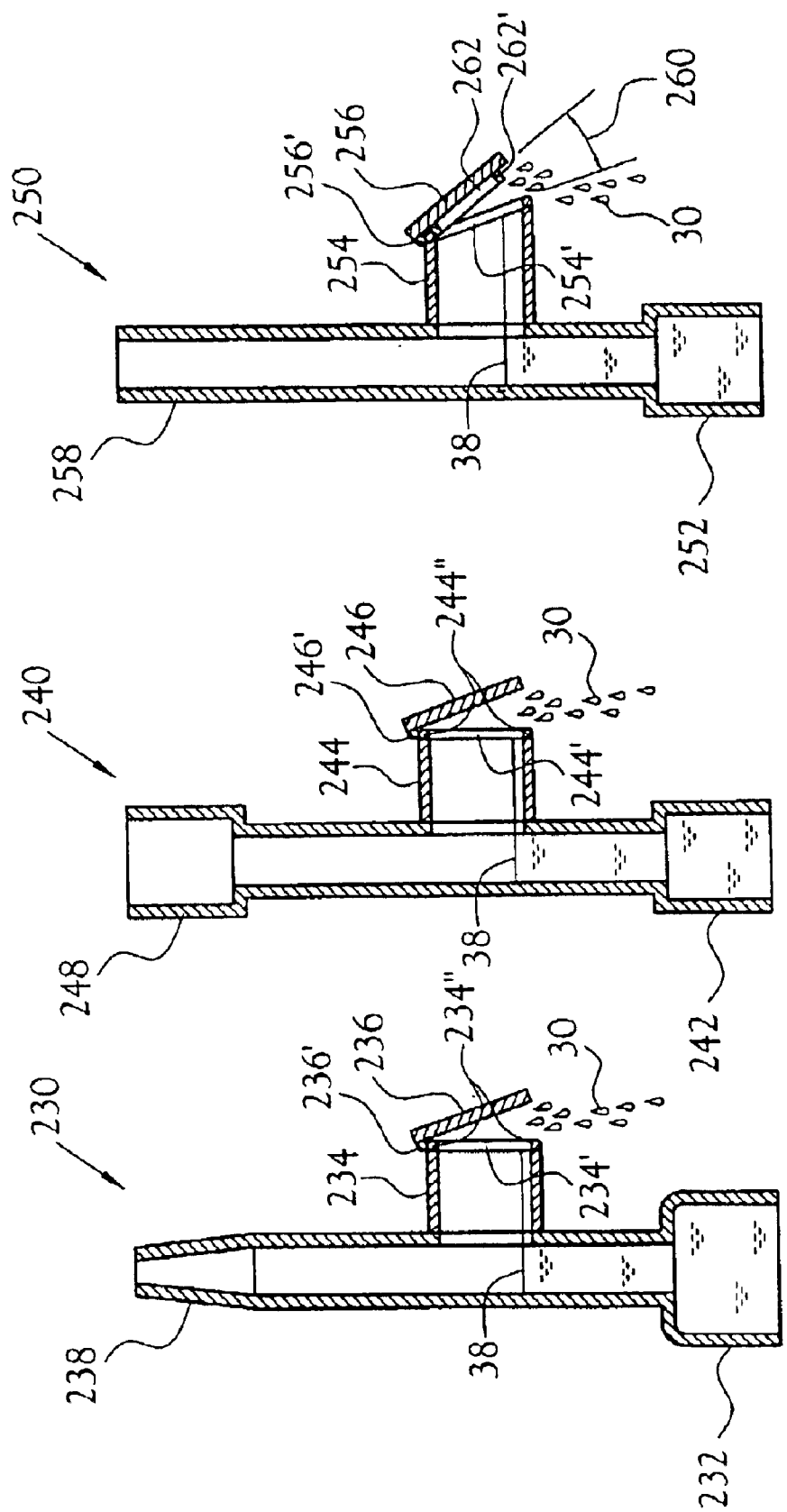

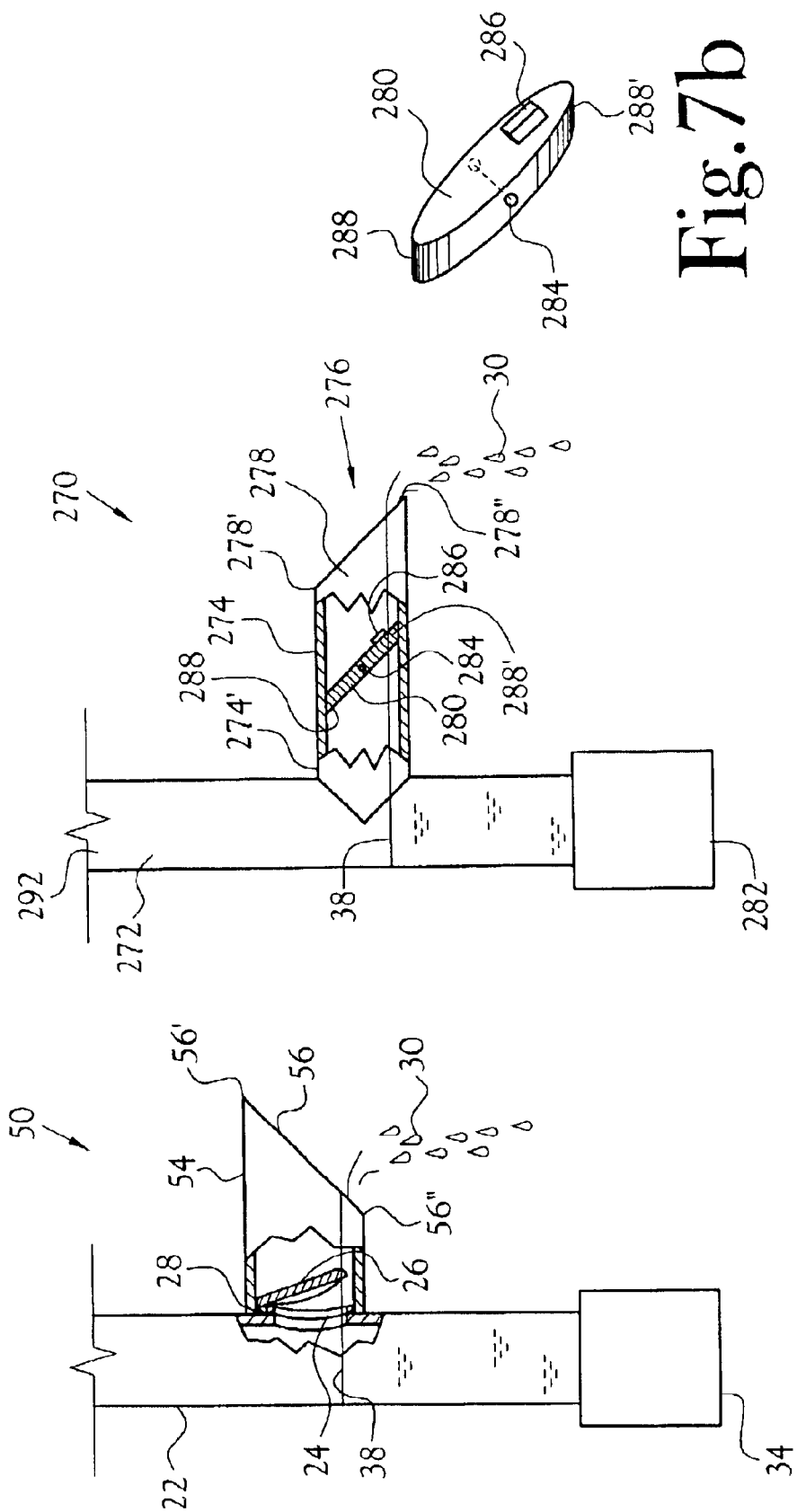

FLUID RELEASE SYSTEM FOR SECONDARY CONDUITS EXTENDING BETWEEN A TRANSFORMER HOUSING AND A METER BOX AND METHOD OF USE

CROSS REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of Invention

This invention pertains to a valve system for removal of water from secondary conduits containing electrical cables connected to electrical transformers, and more particularly pertains to a fluid release system for removal of water from secondary conduits which contain electrical cables extending between a transformer housing and an electrical meter unit.

2. Description of the Related Art

Modern commercial building developments and residential housing developments typically require installation of a plurality of electrical cables between a primary power grid and secondary conduit having electrical cables therein. The electrical cables are contained in conduits that are typically buried underground due to the requirements of local building codes. A primary power grid provides electricity transmitted along electrical cables enclosed in primary conduits extending to a pad mounted transformer. The transformer is positioned aboveground on, or directly on top of, an underground vault on a residential or commercial property. One or more secondary conduits containing electrical cables are installed between the transformer and an electrical meter box normally installed on an exterior wall of a residential or commercial building. The electrical connections between the electrical cables and the electrical meter box are sensitive to exposure to moisture if water is allowed to intrude into, and move within the secondary conduit. If water reaches the electrical meter box, water may enter the interior walls of a residential or commercial building, and corrosion of electrical connections can occur. Moreover, electrical circuit breakers may trip causing interruption in power to the home or business. Also, any contact with the meter box, or disconnect box containing moisture could result in shock or electrocution. Regardless of proper installation of underground secondary conduit that are initially waterproof at each connection between a transformer and an electrical meter box, water can intrude from inadequate conduit connections or from seepage of water through cracks in conduit installed underground. Constant water removal from secondary conduit having electrical cables therein is preferred to minimize water seepage into electrical meters installed at residential and commercial buildings.

BRIEF SUMMARY OF THE INVENTION

In accordance with various features of the present invention, a fluid release system is disclosed for releasing water from a release valve when water is received in the valve from secondary conduits connected to the release valve. The secondary conduits contain electrical cables extending between a transformer and an electrical meter installed on an exterior wall of a residential or commercial building. The secondary conduits can accumulate water transferred from a below-grade transformer vault, or from leakage into underground portions of the secondary conduit. The release valve includes a valve opening for release of water collected in the secondary conduits. A flap is positioned to pivot between closed and open positions to allow passage of water through the valve opening. More specifically, the flap is pivoted to the open position when water within the release valve reaches a sufficient water level to force the flap open. The flap is biased by the weight of the flap, or by a spring tension of a hinged connector, to return to the closed position when the water level is reduced below the level of the valve opening. The release valve includes connector ends sized to be attached to various sizes of secondary conduits. Installation of the fluid release system provides for efficient removal of water from secondary conduits containing electrical cables therein, thereby minimizing the damage created when water is transported within secondary conduits to an electrical meter box and associated circuit breakers installed at a residential or commercial building. Without the fluid release system, the secondary conduits can transport water into the electrical meter installed on the exterior wall of a building, with a triggering of electrical circuit breakers and disrupting of power to the building. A method of releasing water from within secondary conduits by use of the release valve is also disclosed.

BRIEF DESCRIPTION OF THE SEVERAL VIEWS OF THE DRAWINGS

The above-mentioned features of the invention will become more clearly understood from the following detailed description of the invention read together with the drawings in which:

FIG. 3 is a side view of an alternative embodiment of a fluid release valve illustrating a side valve extension having a flap attached;

FIG. 4 is a side view of an alternative embodiment of a fluid release system of FIG. 3, illustrating the release valve having alternative connector ends;

FIG. 5 is a side view of an alternative embodiment of a fluid release system, illustrating the release valve including a side valve extension having an angled end opening with a flap attached thereto;

FIG. 6 is a side cutaway view of an alternative embodiment of the release valve, illustrating a valve flap covered in a side valve extension;

FIG. 7a is a side cutaway view of an alternative embodiment of the release valve, illustrating a side valve extension having a valve flap disposed in a pivoting relationship within the side valve extension; and FIG. 7b is a detailed side view of the valve flap of FIG. 7a.

DETAILED DESCRIPTION OF THE INVENTION

Figure 1:
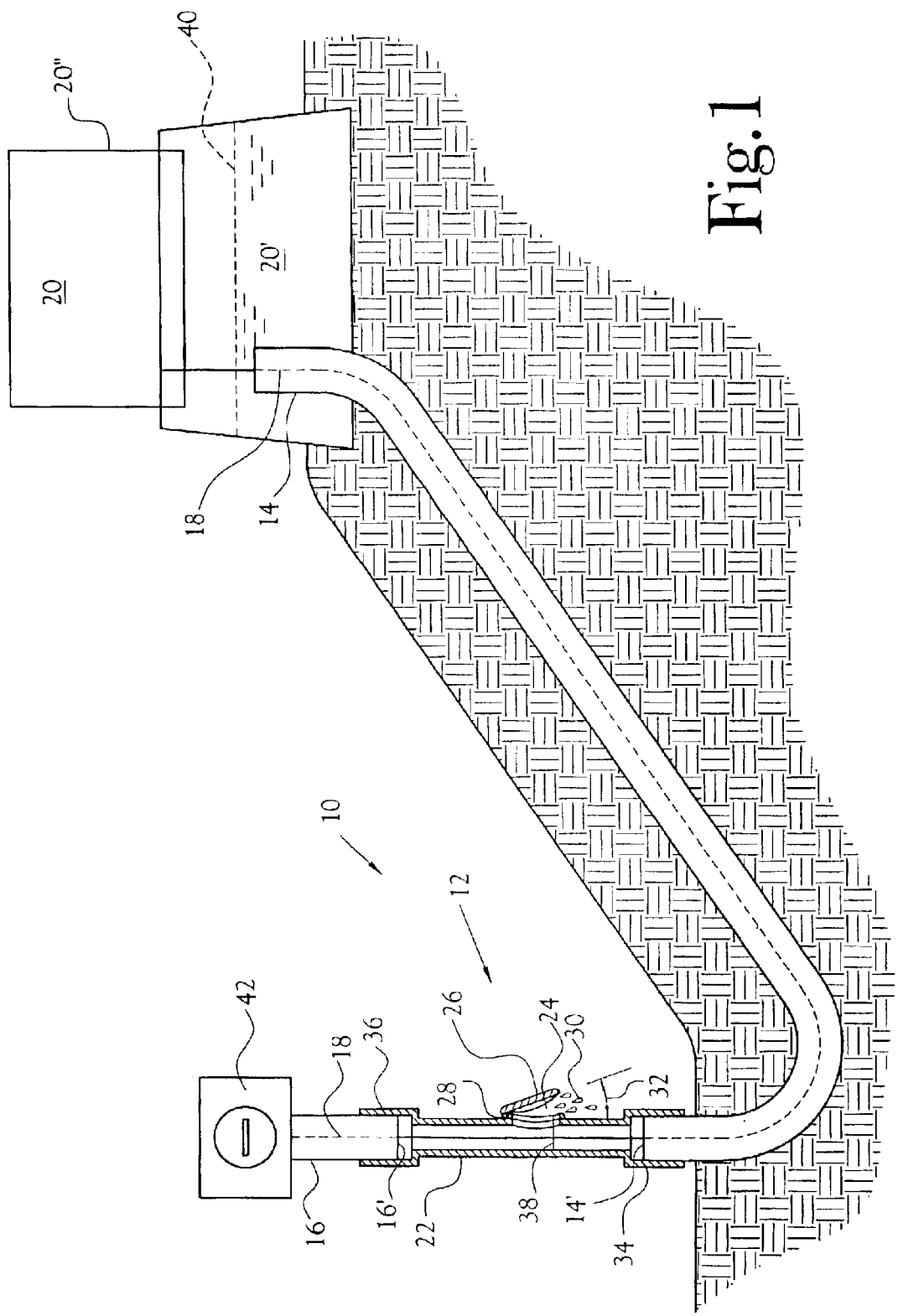
FIG. 1 is a side view of a fluid release system constructed in accordance with various features of the present invention, illustrating the fluid release system installed between secondary conduits extending between a transformer in a vault and an electrical meter.

A fluid release system 10 is disclosed as illustrated generally in FIG. 1, including a release valve 12 for release of water transferred from secondary conduits 14, 16 connected to the release valve 12. Water is collected within the release valve 12 for periodic release from a valve opening 24 when a sufficient water level 38 is reached in the release valve 12. The secondary conduits 14, 16 typically contain at least one electrical cable 18 extending between a transformer 20 and an electrical meter 42 installed on an exterior wall of a residential or commercial building. The release valve 12 releases water accumulated from a transformer 20 and a transformer vault 20' positioned at about the level, or above the level of the release valve 12.

In one embodiment of the fluid release system 10, the release valve 12 includes a tubular member 22 having a hollow interior through which at least one electrical cable 18 extends between the secondary conduits 14, 16. The tubular member 22 includes a first connector end 34 that is releasably connected to the secondary conduit 14 extending from the transformer 20. The tubular member 22 includes a second connector end 36 that is releasably connected to an additional secondary conduit 16 extending to an electrical meter 42 installed on an exterior wall of a building. The connector ends 34, 36 can include alternative configurations as illustrated in FIGS. 3–5.

Figure 2A:
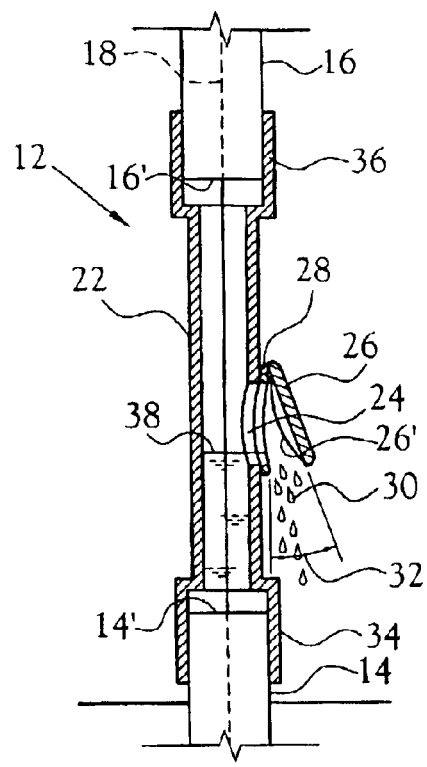
FIG. 2a is a side view of a fluid release system of FIG. 1, illustrating a release valve flap in an open position.
Figure 2B:
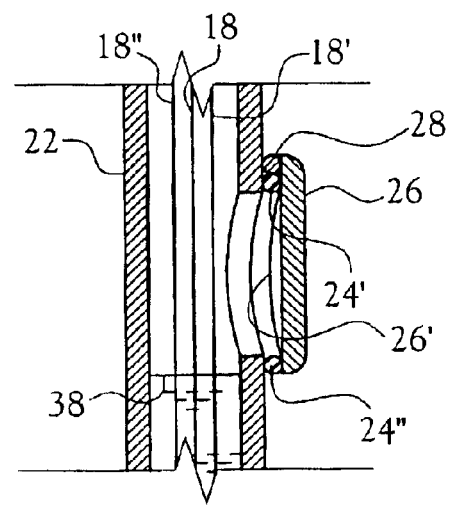
FIG. 2b is a side view of a fluid release system of FIG. 1, illustrating the release valve flap in a closed position.

FIGS. 2a and 2b illustrate one embodiment of the release valve 12 including the valve opening 24 extended through a side wall of the tubular member 22. The valve opening 24 extends partially around the curvature of the side wall, and is generally oval in shape. When uncovered, the valve opening 24 allows water to be released as shown at 30 from the release valve 12 when a sufficient water level 38 is reached within the tubular member 22. A flap 26 is sized and shaped to cover the valve opening 24 in the tubular member 22. The flap 26 is connected proximal to the valve opening 24 to allow the flap 26 to pivot between an open position (see FIG. 2a) and a closed position (see FIG. 2b). One embodiment of the flap 26 includes a curved outer surface to fit over the valve opening 24. A gasket 24', 24" is positioned around an external surface perimeter of the valve opening 24 to seal a flap interior surface 26' against the gasket 24', 24" in order to minimize rainwater flow into the valve opening 24. The flap 26 is forced open when water collects to the sufficient water level 38 within the release valve 12. An alternative embodiment for a sealing gasket includes an appropriately shaped circular or oval gasket that is attached to the flap interior surface 26'. An alternative embodiment of the flap 26 includes an outer surface curvature that is curved similar to the external surface of the tubular member 22 and is sized in circumference to allow the flap 26 to fit into the valve opening 24. The alternative flap embodiment allows the flap 26 to fit substantially flush (not shown) with the external surface of the tubular member 22.

The flap 26 is attached by a hinge 28 to allow the flap 26 to cover the perimeter of the valve opening 24 in the closed position (see FIG. 2b). One embodiment of the hinge 28 includes an internal spring means such as a spring within the hinge which provides a spring tension that biases the flap 26 towards the closed position. As illustrated in FIG. 2a, the flap 26 pivots to an open position when the water level 38 within the tubular member 22 reaches the sufficient level to force open the flap 26, allowing for water release 30 from the tubular member 22. The embodiment of the hinge 28 having the internal spring means such as a spring mechanism (not shown) allows the release valve 12 to be oriented in a vertical orientation or in a generally horizontal orientation. When oriented in a generally horizontal orientation, the flap 26 and valve opening 24 are preferably oriented downwards for rapid water release 30 from the release valve 30 when the flap 26 is in the open position.

An alternative embodiment of the flap 26 includes a flap having a sufficient flap weight, or a weight positioned on the flap, that biases the flap 26 to the closed position (see FIG. 2b) when a water level 38 within the tubular member 22 is below a lower rim of the valve opening 24. The flap 26 pivots to the open position (see FIG. 2a) when the water level 38 rises above the lower rim of the valve opening 24, and provides pressure against the flap interior surface 26' that exceeds the weight of the flap 26. For the weighted flap embodiment, the tubular member 22 is preferably in a substantially vertical orientation, with no spring means required for biasing the hinge 28 to the closed position. With the flap 26 pivoted to the open position (see FIG. 2a), the discharge 30 of water through the opening 24 provides for release of water without human monitoring of the water levels within the secondary conduits 14, 16. After a sufficient volume of water is discharged 30 from the tubular member 22, the water level 38 is lowered within the tubular member 22, and the flap 26 is returned to the closed position by the weight of the flap 26. A range of pivoting movement 32 of about 15 degrees to about 20 degrees is provided for the flap 26 by the hinge 28 connected proximal to the valve opening 24. Moreover, the flap 26 can be biased to the closed position under its own weight, and opened when the water in the release valve 12 applies an opening force to the flap 26 (see FIG. 2a).

In one alternative embodiment of a release valve 50, the side opening 24 and flap 26 are covered by a housing 54 extended from a substantially vertical tubular member 22 (see FIG. 6). The housing 54 is tubular in cross-section and is extended laterally about one-half inch to about one inch from the external surface of the tubular member 22. The housing 54 provides a protective structure to shield the side opening 24, flap 26 and hinge 28 from cross-winds to minimize premature opening of the flap 26, and to provide protection from rainwater infiltration when the flap is opened during a water discharge 30. An open distal end 56 of the housing 54 preferably includes a slanted cross-sectional cut, having an upper edge 56' extended further from the tubular member 22 than the lower edge 56" to provide protection from rainwater infiltration when the flap is open (see FIG. 6). The tubular member 22 is preferably installed in a plumb, vertical orientation for proper operation of the flap 26 enclosed within the housing 54. Alternative shapes of the cross-section of the housing 54 can include any cross-section that provides for a water-tight connection against the side of the tubular member 22 while covering the side opening 24, flap 26 and hinge 28 for protection from rainwater infiltration.

In the embodiment illustrated in FIG. 1, the release valve 12 is easily installed in a preferably vertical orientation at the connecting junction of the conduit ends 14', 16' during installation of the secondary conduits 14, 16 containing electrical cables therein. The electrical cable 18 illustrated in FIG. 1 can include additional electrical cables 18', 18" (see FIG. 2b). The plurality of electrical cables 18, 18', 18" are contained in the secondary conduits 14, 16 to protect the cables from exposure to groundwater or rainwater, and to protect the public from contact with the cables. One source of water in the secondary conduit 14 occurs from accumulation of groundwater 40 collected in a below-grade transformer vault 20' or rainwater collected in a housing 20" covering the transformer 20. The connected electrical conduits 14, 16, if installed without a release valve 12 connected therebetween, can transfer water within secondary conduit 16 to an electrical meter 42 installed on an exterior wall of a building due to transfer of water from underground portions of the secondary conduit 14. Without installation of the fluid release system 10, the secondary conduits 14, 16 can transfer water to a base of the electrical meter 42 for leakage of water into electrical circuit breakers with disruption of electrical power to the building. The fluid release system 10 also avoids the transfer of water through a base of the electrical meter 42 and through the exterior wall of the building, with leakage of water into the interior walls of the building.

Installation of the release valve 12 includes connection of a first conduit end 14' to the valve first end 34. A valve second end 36 is connected to a second conduit end 16' of the secondary conduit 16 extended to the electrical meter 42. A typical construction of the electrical cable conduits 14, 16 includes plastic piping of various widths and lengths commonly utilized for enclosure of electrical cables 18, 18', 18". Examples of typical conduit sizes include schedule 40 PVC conduit, having wall thickness of about 3/16 inch. The 40 PVC conduit provides an inner diameter within a range of about two inches to about four inches, and an outer diameter within a range of about two and three-eighths inches to about four and one-half inches. Heavier grade conduit includes schedule 80 PVC conduit having wall thickness of about ¼ inch. The 80 PVC conduit provides an inner diameter within a range of about one and seven-eighths inches to about three inches, and an outer diameter of about two and three-eighths inches to about three and one-half inches. The release valve system 10 can connect between various sized ends of secondary conduits 14, 16 to provide for water discharge 30 that accumulates in either conduit 14, 16.

An alternative embodiment of a fluid release system is illustrated in FIG. 3 for a fluid release valve 230 including an elongated tubular middle segment that includes a valve extension 234 having an opening 234' therethrough. The opening 234' provides a path for water discharge from the interior of the release valve 230. The opening 234' is covered by a flap 236 that is pivotably connected to the valve extension 234. The ends of the opening 234' may include a gasket 234" against which the flap 236 rests in a closed position. The flap 236 reciprocates between a closed position and an open position depending on the water level 38 within the release valve 230 and the pressure exerted by the water against the interior of the flap 236. A spring means in a hinged connection 236' of the flap 236 provides a spring tension that biases the flap 236 to a closed position when the water level 38 subsides within the release valve 230 below the level of the valve extension 234. Alternatively, the weight of the flap 236 could serve as the biasing force for closure against the ends of the opening 234'. A bell shaped connector end 232 at a first end of the release valve 230 is sized to connect to a conduit end 14' of a secondary conduit 14. A second connector end 238 is sized to connect into a conduit end 16' of a conduit 16 to minimize seepage of rainwater into the release valve 230.

Another alternative embodiment of a fluid release system is illustrated in FIG. 4 for a fluid release valve 240 including an elongated tubular middle segment having a valve extension 244 extended from the release valve 240. The valve extension 244 includes an opening 244' therethrough. The opening 244' provides a path for water discharge 30 from the interior of the release valve 240. The opening 244' is covered by a flap 246 that is connected by a hinge 246' to the valve extension 244. The opening 244' may include a gasket 244" disposed on the end of the opening against which the flap 246 rests in a closed position. The flap 246 reciprocates between a closed position and an open position, depending on the water level 38 within the release valve 240 and the pressure exerted by the water against the interior of the flap 246. A spring tension in the hinge 246' provides a spring tension that biases the flap 246 to a closed position when the water level 38 in the release valve 240 subsides below the level of the valve extension 244. A first connector end 242 and a second connector end 248 are bell-shaped and are sized to connect to respective ends of secondary conduits 14, 16 to facilitate connection of a smaller diameter secondary conduit end into either connector end 242, 248. Sealing materials such as epoxy and caulking know to those skilled in the art can be applied to the junctions of the connector ends 242, 248 and secondary conduits 14, 16 to minimize seepage of rainwater into the release valve 240.

An additional alternative embodiment of a fluid release system is illustrated in FIG. 5 for a fluid release valve 250 including a tubular middle segment having a valve extension 254 extended from one side of the release valve 250. The valve extension 254 includes an angled end having an opening 254' therethrough. The opening 254' is in hydraulic connection with the interior of the release valve 250. The valve extension 254 includes a flap 256 connected by a hinge 256' for closure over the opening 254'. The flap 256 includes an interior surface 262 that inserts into the opening 254' when in the closed position. The interior surface 262 includes a perimeter gasket 262' positioned on a circumference of the interior surface 262 for improved sealing of the flap 256 and for reduction of inflow of rain water when the flap 256 is in the closed position. The flap 256 reciprocates between a closed position and an open position depending on the water level 38 within the release valve 250 and the pressure exerted by the water against the flap interior surface 262. A range of pivoting of the flap 256 of about 15 degrees to about 20 degrees of movement 260 is provided by the hinge 256'. A spring tension in the hinge 256' provides a spring tension that biases the flap 256 to a closed position when the water level 38 subsides within the release valve 250. The first connector end 252 and the second connector end 258 are sized to connect with the ends of the secondary conduits 14, 16 to minimize seepage of rainwater into the release valve 250.

A further alternative embodiment of a fluid release valve 270 is illustrated in FIGS. 7a and 7b, including a tubular member 272 having a side extension tube 274 attached to enclose a side opening 274' through the tubular member 272. The extension tube 274 extends to a distal end 276 formed by a slanted cross-sectional cut. A distal end opening 278 is bounded by a tube upper edge 278' and a tube lower edge 278" that are extended a distance of between about three inches to about four inches from the curved side surface of the tubular member 272. The side extension tube 274 includes an interior flap 280 mounted to pivot about a connector pin 284 in the illustrated embodiment supported between the interior tube walls and disposed along a substantially horizontal axis of the flap 280. The flap 280 is biased into a closed position against interior wall surfaces within the extension tube 274 by a weight 286 carried on a lower portion of the flap 280. The flap 280 is maintained in the closed position when the interior water level 38 is below the level of the lower portion of the flap 280. The weighted flap 280 is temporarily pivoted to an open position disposed apart from the interior wall surfaces when an interior water level 38 reaches an adequate height within the extension tube 274 to force the flap 280 to the open position for water discharge 30. The interior flap 280 has an elongated shape and includes appropriately beveled upper edges 288 and beveled lower edges 288', thereby providing water-tight closure of the flap upper edges 288 and lower edges 288' when biased in the closed position against the interior wall surfaces of extension tube 274. The interior flap 280 will reciprocate between the closed position and open position for water discharge 30 even if the tubular member 272 is not mounted in a substantially plumb, vertical orientation. The connector ends 282, 292 of the fluid release valve 270 are appropriately sized to connect to secondary conduits 14, 16. Alternative configurations for the connector ends of each of the release valves 10, 230, 240, 250, 270 can be utilized without departing from the spirit and scope of the present invention.

The fluid release system 10 provides for a method of release of water that has collected in one or more secondary conduits 14, 16 extended between a transformer 20 in a transformer vault 20' and a electrical meter 42. The method of relieving water buildup includes a step of providing a fluid release system 10 for discharge of water collected within a release valve 12. The step of providing includes the release valve 12 provided with a valve opening 24 through which water is released by periodic pivoting of a flap 26 disposed to cover the valve opening 24. The method includes a step of connecting the release valve 12 between respective ends of the secondary conduits 14, 16 containing electrical cables extending between the transformer 20 and the electrical meter 42. A step of releasing proceeds when the water within the release valve 12 reaches a water level 38 adjacent the valve opening 24 due to the transfer of water from the secondary conduits 14, 16 connected to the release valve 12. The step of releasing occurs independent of human activity such as inspections of the operation of the release valve 12 because the flap 26 automatically reciprocates between open and closed positions dependent on the water level 38 within the release valve 12. The step of releasing is followed by a step of sealing of the flap 26 against the valve opening 24 when the water level 38 is reduced by water release 30 from the release valve 12. The step of sealing returns the flap 26 to a closed position due to the weight of the flap 26 or a spring tension within a hinge 28 connecting the flap 26 to close over the valve opening 24. It will be recognized that alternative method steps for installation and operation of the fluid release system 10 can be utilized without departing from the spirit and scope of the present invention.

While the present invention has been illustrated by description of several embodiments and while the illustrative embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and methods, and the illustrative examples shown and described. Accordingly, departures may be made from such details without departing from the spirit or scope of applicants' general inventive concept. Having thus described the aforementioned invention,

I claim:

1. A fluid release system for expelling water from within secondary conduits which contain electrical cables extending between a transformer and an electrical meter box, the water buildup occurring from leakage of water into the secondary conduits, from a transformer housing or from a surrounding environment, comprising:

a release valve including a valve opening therein, said release valve being disposed with opposed connector ends releasably attachable to at least one of the secondary conduits extended between a transformer housing and an electrical meter box, said release valve is disposed a spaced apart distance from the transformer housing and proximal of the electrical meter box; and a flap disposed to cover said valve opening, said flap is positioned to pivot against said valve opening by a hinge connected proximal to said valve opening, said flap reciprocates between an open position upon occurrence of a water level adjacently interior of said valve opening, and a closed position upon the water level being reduced within the interior of the valve opening to engage said flap against said valve opening;

whereby water is discharged from said valve opening as said flap is pivoted to said open position by water collected within said release valve from the secondary conduits having water therein thereby directly releasing water to the environment before water contact with the electrical meter box.

2. A fluid release system for removal of water from within secondary conduits containing electrical cables extending between a transformer and an electrical meter, the water within the secondary conduits occurring from leakage of water into the secondary conduits from a transformer housing or from a surrounding environment, comprising:

a release valve including a valve opening therein, said release valve having opposed connector ends sized to be sealingly connected between respective secondary conduits extended between a transformer housing and an electrical meter, said release valve is positioned a spaced apart distance from the transformer housing; and a flap disposed to cover said valve opening, said flap is positioned to pivot against said valve opening by a hinge connected proximal to said valve opening, said flap reciprocates between an open position and a closed position against said valve opening, said flap having a sufficient weight to bias said flap to said closed position;

whereby water is discharged from said release valve as said flap is pivoted to said open position by water collected within said release valve from the secondary conduits having water leakage therein thereby directly releasing water to the environment before contact with the electrical meter.

3. The fluid release system of claim 2 wherein said valve opening including a gasket positioned to encircle said valve opening in said release valve, whereby said flap is disposed against said gasket when said flap is in said closed position.

4. The fluid release system of claim 2 wherein said flap having an inwardly disposed side configured to fit into said valve opening, said inwardly disposed side having a perimeter gasket positioned to contact said valve opening of said release valve when said flap is disposed in said closed position into said valve opening of said release valve.

5. The fluid release system of claim 2 wherein said flap including a connecting end to which said hinged connector is attached, said flap further including a reciprocating end opposed from said connecting end, said flap reciprocating end remains in said closed position until fluid levels within said release valve exceeds said sufficient weight of said flap.

6. The fluid release system of claim 5 wherein said hinged connector including a spring tension for biasing said flap to said closed position, said flap pivots to said open position when said spring tension of said hinged connector is exceeded by the fluid levels within said release valve.

7. The fluid release system of claim 6 wherein said reciprocating end of said flap having a range of movement of about an angle of up to about 15 degrees to about 20 degrees of movement from said valve opening upon application of sufficient fluid levels within said release valve.

8. The fluid release system of claim 2 wherein said opposed connector ends including:
a first connector end having a first bell-shaped connector housing thereon, said first bell-shaped connector housing provides a substantially water-tight connection with a first secondary conduit;
a second connector end having a second bell-shaped connector housing thereon, said second bell-shaped connector housing provides a substantially water-tight connection with a second secondary conduit; and
said first and second connector ends having an interior opening for passage of at least one electrical cable therethrough.

9. The fluid release system of claim 2 wherein said opposed connector ends including:
a first connector end having a connector housing having a width substantially equal to the width of said release valve, said connector housing is connected to a first secondary conduit to provide a substantially water-tight connection with the first secondary conduit;
a second connector end having a bell-shaped connector housing thereon, said bell-shaped connector housing provides a substantially water-tight connection with a second secondary conduit; and
said first and second connector ends having an interior opening for passage of at least one electrical cable therethrough.

10. The fluid release system of claim 2 wherein said opposed connector ends including:
a first connector end having a connector housing having a width less than the width of said release valve, said connector housing is connected into a first secondary conduit to provide a substantially water-tight connection with the first secondary conduit;
a second connector end having a bell-shaped connector housing thereon, said bell-shaped connector housing provides a substantially water-tight connection with a second secondary conduit; and
said first and second connector ends having an interior opening for passage of at least one electrical cable therethrough.

11. The fluid release system of claim 2 wherein said release valve having a valve extension connected to extend laterally from said release valve, said valve extension having an end opening that is in fluid communication with an interior of said release valve for movement of water out of said release valve, said end opening is covered by said flap in said closed position.

12. The fluid release system of claim 11 wherein said valve extension including an angled end opening, said angled end opening is covered by said flap pivotably moved to said closed position.

13. A fluid release system for release of water retained within secondary conduits connected between a transformer and an electrical meter, the water being retained within the secondary conduits as a result of water leakage into the secondary conduits from a transformer housing or from a surrounding environment, comprising:
a release valve including a side opening disposed to allow passage to the surrounding environment of water collected within said release valve, said release valve including connector ends attachable to the secondary conduits extended between a transformer housing and an electrical meter, said connector ends allow water transfer into said release valve from the secondary conduits, said release valve is positioned a spaced apart distance from the transformer housing and proximal to the electrical meter; and
a flap pivotably disposed to reciprocate between a closed position blocking passage of water from said side opening and an open position allowing passage of water from said side opening, said flap being biased to said closed position;
whereby water is discharged from said side opening when water pressure from water collected within said release valve forces said flap to said open position thereby releasing water to the surrounding environment before contacting the electrical meter.

14. The fluid release system of claim 13 wherein said side opening including a gasket positioned to encircle said side opening of said release valve, said flap is disposed against said gasket when said flap is in said closed position.

15. The fluid release system of claim 13 wherein said flap having a perimeter configured to fit into said side opening, said flap perimeter having a perimeter gasket positioned to contact proximal to said side opening when said flap is disposed in said closed position.

16. The fluid release system of claim 13 wherein said flap including a hinge attached proximal to said side opening of said release valve, said hinge having a spring means for biasing said flap to said closed position until the water collected within said release valve overcomes the biasing of said spring means and said flap to said closed position, whereby said flap temporarily moves to said open position.

17. The fluid release system of claim 13 wherein said release valve is positioned in a substantially vertical orientation, said release valve including a laterally extended housing disposed to substantially cover said side opening and said flap, said housing is of sufficient length to cover said flap when reciprocated to said open position.

18. The fluid release system of claim 13 wherein said release valve including a tubular member attached to laterally extend from said side opening of said release valve, said tubular member extended to a distal end having a slanted cross-sectional cut opening, said tubular member having an internal flap pivotably connected within said tubular member such that said flap is biased to a closed position against interior surfaces within said tubular member when the water within the release valve is below said laterally extended tubular member.

19. The fluid release system of claim 18 wherein said flap is connected between interior surfaces within said tubular member by a pivot connector disposed along a substantially horizontal axis of said flap, said flap including lower and upper edges having beveled edge surfaces to assist in water-tight closure of said flap against interior surfaces of said tubular member.

20. The fluid release system of claim 13 wherein said connector ends including:
a first connector end having a connector housing having a diameter adequate to provide a water-tight connection with a first conduit of said secondary conduits;
a second connector end having a diameter adequate to provide a water-tight connection with a second conduit of said secondary conduits; and
said first and second connector ends having interior openings for passage of at least one electrical cable therethrough.

21. The fluid release system of claim 13 wherein said release valve including a valve extension extending laterally from said release valve, said valve extension having an end opening covered by said flap in said closed position.

22. The fluid release system of claim 21 wherein said valve extension including an angled end opening, said angled end opening is covered by said flap pivotably moved to said closed position.

23. A method of releasing water from within a secondary conduit containing electrical cables extending between a transformer and an electrical meter, the water within the secondary occurring from leakage of fluids into the secondary conduit from a transformer housing or from the surrounding environment, comprising the steps of:

providing a release valve for discharge of water from an interior of said release valve, said step of providing including said release valve having a side opening through which water is released by reciprocation of a flap covering said side opening;

connecting said release valve with a secondary conduit containing electrical cables connected between the transformer and the electrical meter, said connecting step positioning said release valve a spaced apart distance from the transformer housing and proximal to the electrical meter; and releasing water from the interior of said release valve by reciprocation of said flap covering said side opening, said step of releasing proceeds when water within said release valve reaches a water level adjacent said side opening with resulting movement of said flap to an open position for release of water from the secondary conduit connecting to said release valve, said step of releasing providing for expelling water directly to the environment before contact with the electrical meter.

24. The method of claim 23 further comprising a step of sealing of said flap against said side opening when the water level in said release valve is reduced by draining of water out of said release valve, whereby said step of sealing returns said flap to a closed position until the water level increases within said release valve from additional transfer of water from the secondary conduit connected between the transformer and the electrical meter.

25. The method of claim 24 wherein said step of releasing and said step of sealing further including a step of reciprocating of said flap between the open position and the closed position dependent on the height of the water level within said release valve without outside influence by human activity after said step of connecting is completed.

* * * * *